INVENTORS.
ROBERT L. GARRETT,
WILLIAM J. McDONALD, JR

ATTORNEY.

United States Patent Office 3,528,218
Patented Sept. 15, 1970

3,528,218
SUPERSONIC FLOW SEPARATOR WITH ADMIXING
Robert L. Garrett and William J. McDonald, Jr., Houston, Tex., assignors to Esso Production Research Company, a corporation of Delaware
Filed May 20, 1968, Ser. No. 730,374
Int. Cl. B01d 51/08
U.S. Cl. 55—15  19 Claims

ABSTRACT OF THE DISCLOSURE

Method and apparatus for separating one or more components from a multicomponent, high-pressure gas stream. The gas stream is expanded to supersonic velocities through a supersonic effuser to achieve low temperatures and low pressures in the supersonic gas stream and cause liquid (drops) and/or soild particles to condense. The supersonic gas stream is made to traverse a planar bend provided with a permeable outer wall to and through which the condensed particles are inertially moved and thereby separated from the gas stream. The separated particles are collected along with the dissolved and entrained gases which also separate from the gas stream. The supersonic gas stream is then decelerated to subsonic flow through a diffuser and part of the pressure of the gas is recovered. A material is intimately mixed with components of the gas stream to improve the efficiency of recovery of some components of the gas stream. The mechanisms involved in improving such inertial recovery efficiency include making condensed particles grow larger; providing a more dense or massive agent onto which components dissolve, react chemically or adsorb; and/or maintaining a free flowing system by inhibiting certain solids formation in the cold gas stream. The material may be a vapor, solid or liquid (or mixtures of these). The permeable outer wall may be heated to melt certain solids which form in the cold stream and deposit on the permeable wall.

---

The present invention generally concerns supersonic separation of condensable components of a multicomponent, high-pressure gas stream. More particularly, the present invention concerns method and apparatus in which high efficiency expansion of a gas stream to supersonic velocities cools the gas stream to form a condensed phase. The condensed phase, as liquid and/or solid particles, is inertially moved to and through a permeable wall as the gas stream traverses a planar bend. A diffuser located at the end of the bend compresses and decelerates the gas stream to low subsonic velocities. Gases, either entrained or dissolved in the condensed phase, also are separated from the gas stream along with the condensed phase.

In accordance with the teachings of the present invention, a material is introduced to enhance the performance of the supersonic separator. The material introduced and intimately mixed with the gas stream functions to improve efficiency of recovery of components in the supersonic separator in various (or combinations of these) ways:

(1) The material may be a vapor which condenses upon cooling which increases the volumetric liquid/vapor ratio within the supersonic channel and thus enhances liquid recovery efficiency of some or all components by increasing the droplet coalescence rate. As an example, propane vapor is injected into a natural gas stream to add liquid phase after the propane cools and condenses.

(2) The material may be a finely divided solid adsorbant which furnishes large surface area sites onto which some components of the gas stream may become preferentially attached, and which is readily inertially ejected because of the high density and large mass of the solid. As an example, carbon (activated) or silica gel particles are injected into a natural gas stream to absorb components such as ethane, propane, butane, etc., which are not entirely liquified.

(3) The material may be a dispersed liquid mixed in the stream into which some gas stream components can be preferentially absorbed and more efficjently ejected and recovered. As an example, "lean oil" solvent (hexane to decane) is sprayed into a natural gas stream to absorb ethane, propane and butane which are not entirely liquified.

(4) The material may be an antifreeze agent which prevents solids from forming at low temperature. As an example, methanol or glycol is introduced into a water-bearing natural gas stream to inhibit ice and hydrate formation which results from the water present.

(5) The material may be or may contain a chemical which reacts with and removes reactive components from the stream by inertial separation of the new heavier species created in the reaction. As an example, (a) an acid or an acidic solution is introduced and reacts with an ammonia gas stream and (b) an amine solution is injected into a natural gas stream to remove "sour" components $CO_2$ and $H_2S$.

In addition, the permeable wall may be heated to melt ice and hydrates and other solids which form in the cold gas stream and deposit on the permeable wall.

Briefly, then, the present invention involves method and apparatus for use therewith for separating condensable components from a multicomponent gas stream which includes the steps of expanding the gas stream through a supersonic effuser to achieve low temperatures and low pressures in the supersonic gas stream and to form thereby condensed particles; separating the condensed particles from the gas stream by directing the gas stream to traverse a planar bend provided with a permeable wall to and through which the condensed particles are inertially moved; decelerating the gas stream to subsonic flow through a diffuser and recovering a portion of the pressure of the gas stream; and introducing a material into and intimately mixing said material with the gas stream to enhance the efficiency of removal of the condensed particles from the gas stream. Such material is preferably introduced into the gas stream upstream of the supersonic effuser, and thereby attains greater, faster and more intimate mixing. In some cases, however, the material could be added downstream of the effuser to accomplish the intended improved efficiency.

The efficiency of inertial removal of the particles is higher when the average particle's mass is larger. Increased density or size of particles contributes to improved efficiency. Larger droplets are attained when liquid is more copious because droplets are more likely to collide and coalesce in a stream containing a high liquid population. Liquid and/or solid material may be recycled back into the gas stream after separation from the gas stream and from the condensed liquid. Such material introduced into the gas stream may comprise only one or more of the condensable components of the gas stream, and may be introduced as either liquid or vapor phase material. In a gas stream containing water or water vapor, ice and/or solid hydrates may form and plug or clog the permeable wall, thus limiting recovery of the droplets. It is most advantageous to cause the water to pass through the permeable wall with the other condensed particles to remove the water from the gas stream; that is, dehydrating the gas stream. Materials such as alcohol, glycols, etc., may be added to the gas stream to depress the freezing temperature of the water and suppress formation of hydrocarbon hydrates to aid passage of the water per se, and inhibit ice and/or hydrates plugging the permeable wall. In some applications, a solid adsorbent material may be introduced to furnish a large area of chemically active sites onto which some component of the gas stream may be preferentially attached and held strongly until removed by a treatment outside of the supersonic gas stream. The solid additive furnishes increased mass for improved inertial ejection efficiency of the attached component. Likewise, an added nonvolatile liquid furnishes large surface area and higher mass for selective and improved component separation in the inertial force separation. Solids which form in the cold gas stream (ice and/or hydrates) and deposit on the permeable wall may be removed by heating the wall.

The following terms used herein are defined in accordance with general aerodynamic usage:

"Supersonic effuser" means a flow channel having a convergent subsonic section upstream of a divergent supersonic section with an intervening sonic throat which functions as an aerodynamic expander.

"Supersonic diffuser" means a flow channel having a convergent supersonic section upstream of a divergent subsonic section with an intervening sonic throat which functions as an aerodynamic compressor.

"Shock wave" means any discontinuity in supersonic flow across which flow properties abruptly change.

"Normal (90°) shock wave" is a shock wave across which gas velocity changes from supersonic to subsonic, as in a diffuser.

"Final shock wave" is a normal shock wave which occurs at or near the throat of a supersonic diffuser.

"Throat" means a reduced area in a flow channel, as in an effuser or diffuser.

"Contour" means shape of the wall or walls of the flow channel, as in an effuser, diffuser or separation bend.

"Gaseous or gas stream" means a stream completely in the gas phase or one containing liquids and/or solids.

A primary object of the present invention is, therefore, to provide improved method and apparatus for separating condensable components from a gaseous flow stream.

The above object and other objects and advantages of the present invention will be apparent from the following description when taken with the drawings wherein.

Figure 1:
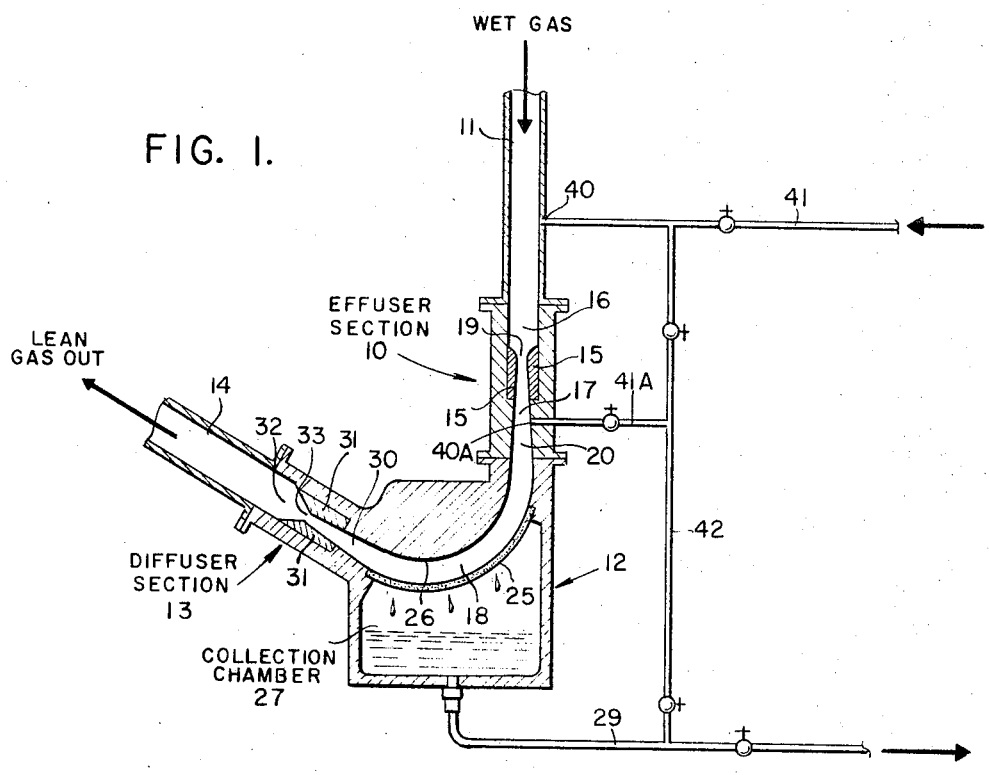
FIG. 1 illustrates one embodiment of the invention in which material is introduced into the gas stream.

Referring to FIG. 1, the components of the supersonic expansion separator illustrated in that figure are an effuser 10 connected at its subsonic end to a source of high-pressure gas in an inlet conduit 11 and at its supersonic end to a separation section 12. The supersonic end of a diffuser section 13 is connected to the downstream end of a separation section 12. The subsonic end of diffuser section 13 is connected to a gas stream discharge conduit 14.

Effuser section 10 includes an effuser 15 having a convergent subsonic end 16 connected to inlet conduit 11 and a divergent supersonic end 17 connected to a flow channel 18 of separation section 12. The effuser also has an intervening throat 19. The function of the effuser is to expand gas flowing therethrough essentially isentropic. The design of effusers of this type is well known to the art and may be according to principles described in DRL Publication No. 406 of the Defense Research Laboratories, University of Texas (1957), or the pamphlet by Kuno Foelsch, No. NA-46-235-2, published by North American Aircraft Corporation, May, 1946. Other references which describe effuser design methods for rectangular cross section configurations are "An Accurate and Rapid Method for the Design of Supersonic Nozzles," Beckworth, J. E., and Moore, J. A., NACA Space TN 3322, February, 1955; "Nozzles for Supersonic Flow Without Shock Fronts," Shapiro, A. H., Journal of Applied Mechanics, Transactions ASME, vol. 66, p. A–93 (1944); "Supersonic Wind Tunnels—Theory, Design and Performance," J. Ruptash, UTIA Review, No. 5, U. of Toronto, I vol. of Aerophysics, June, 1952; and "Nozzle Design," Puckett, A. E., Journal of Applied Mechanics, December 1946, p. 265. A reference describing diffuser design methods for circular cross section configurations is "The Analytical Design of an Axially Symmetric Laval Nozzle for a Parallel and Uniform Jet," Foelsch, J., Journal of Aeronautical Sciences, March, 1949, p. 161 ff.

In gas streams expanded by such supersonic effusers, the temperature achieved can be low, dependent upon the amount of condensation occurring. Such temperatures can be predicted for simple flow systems using information given in The Dynamics and Thermodynamics of Compressible Fluid Flow, vols. 1 and 2, by Ascher H. Shapiro, The Ronald Press Company, New York.

The supersonic section 17 of effuser 15 includes a generally divergent straight flow path 20 of rectangular cross section. This "intermediate" section is used to provide droplet coalescence in certain applications of the supersonic expander; however, it is not a necessary feature in all applications thereof. Flow path or channel 20 is made divergent in order to maintain the gas stream at high velocity. The design of a divergent channel of this type may be found in a number of publications. In the Journal of Applied Physics, June 1946, an article by J. H. Keenan and E. P. Newmann, entitled, "Measurement of Friction in a Pipe for Subsonic and Supersonic Flow of Air," presents experimental data to substantiate theory on friction losses. An article by R. E. Wilson, entitled, "Turbulent Boundary Layer Characteristics at Supersonic Speeds—Theory and Experiment," Journal of Aeronautical Sciences, vol. 17, p. 585, presents a complete description of channel compensation.

Flow path or channel 18 is curved and is preferably of rectangular cross section. It is formed of opposing side walls, an outer curved permeable wall 25 and an inner coplanar curved wall 26. Permeable wall 25 may be formed of permeable metal. Channel 18 is curved in design in accordance with principles set forth in an article by L. Liccini, entitled, "Analytical and Experimental Investigation of 90° Supersonic Turbine Passages Suitable for Supersonic Compressors and Turbines," National Advisory Committee for Aeronautics, RLM 9G07 (1949), or as in an article by E. Boxer et al., entitled, "Application of Supersonic Vortex Flow Theory to the Design of Supersonic Impulse Compressors or Turbine Blade Sections," National Advisory Committee for Aeronautics, RLM 52B06 (1952). Channel 18 is also diverged in accordance with the equations and tables in the aforementioned article by R. E. Wilson. General information on this article, including circularly and rectangularly configured channels may be found in texts, such as vols. 1 and 2 of the aforementioned Shapiro reference and for rectangular configurations alone, the aforementioned bulletin by J. Ruptash.

Permeable wall 25 is held in place by means of wall supports not shown. Liquid droplets and solid particles which separate from the gas stream pass through permeable wall 25 into a collection chamber 27.

A conduit 29 is connected to chamber 27 for the purpose of discharging gas and liquid collected in chamber 27.

The downstream end of channel 18 at the end of the bend or curve connects to the convergent supersonic section 30 of diffuser 31. Diffuser 31 includes a divergent subsonic section 32 which connects to discharge conduit 14. It also has an intervening sonic throat 33. General diffuser design information concerning contours, throat areas, lengths and other parameters thereof can be found in the text, Supersonic Inlet Diffusers and Introduction to Internal Aerodynamics, by Dr. Rudolf Hermann, published by Minneapolis-Honeywell Regulator Company, Minneapolis, Minnesota, and Minneapolis-Honeywell Regulator Company, Ltd., Toronto, Canada, second edition. The diffuser can be made adjustable in its contour and throat area in order to obtain weak shock waves properly located within the convergent portion of the diffuser and a normal (final) shock wave at or near the diffuser throat. The reason for so locating these waves is to achieve maximum pressure recovery by decelerating supersonic flow.

The material introduced into the gas stream may be a solid, a nonvolatile liquid (lean oil) or a volatile liquid (propane) or an antifreeze agent or other material which improves the inertial separation efficiency of the curved-type separator or maintains free flow.

An inlet 40 formed in inlet conduit 11 and an inlet 40A formed in effuser section 10 downstream of throat 19 are connected to a source of material to be introduced into the gas stream upstream of effuser 15 through a conduit 41 and downstream of effuser 15 through a conduit 41, 41A, respectively. The juncture of 40A with the supersonic channel 20 would preferably be a smooth surface such as provided by a sintered material.

In operation, as illustrated in FIG. 1, a high-pressure, multicomponent (rich) gas stream is conducted through inlet conduit 11 and effuser 15. Expansion cooling occurs in effuser 15 as the gas stream attains supersonic velocities in divergent channel 20. Condensable components of the gas stream are condensed as particles. These particles (drops) are inertially moved toward the outer curvature (wall 25) of the bend in channel 18. The particles pass through permeable wall 25 along with some entrained gas and volatile components into collection chamber 27. The remaining supersonic gas stream now stripped of its condensable components is decelerated to near zero velocity by final diffuser 31 and the pressure of the lean stripped gas approaches that of the rich inlet gas. The material to be thoroughly mixed with the gas stream may be introduced into the gas stream through conduit 41 and juncture 40 upstream of effuser 15, or the material may be introduced through conduit 41, 41A at juncture 40A downstream of effuser 15.

The material may be introduced in order to increase the mass of the condensed particles to aid inertial ejection of the particles in the channel bend 18. One way such mass may be increased is by increasing particle (droplet) size by increasing volumetric liquid/vapor ratio. LPG, propane or like material may be introduced into a natural gas stream, for example, either as liquid, atomized liquid or vapor to increase particle size in this manner.

Particle size may also be increased by mixing in the gas stream a dispersed liquid into which some of the gas stream components can be preferentially absorbed. For example, atomized lean oil may be introduced into a natural gas stream to increase condensed particle size. The lean oil, which may be refrigerated, may suitably be a kerosene or lighter molecular weight fraction. When the lean oil is chilled (or further chilled) by the expanded gas stream and a large liquid surface area is available, some of the components both in the gas and liquid phases in the natural gas stream are absorbed or dissolved into the liquid and are held by the liquid until later released by heating. These discrete liquid droplets are larger, more dense and more massive than the condensed phase droplets and, therefore, are inertially ejected with high efficiency through the permeable wall 25.

The mass of the condensed particles may also be increased by introduction of a finely divided solid absorbant which furnishes large surface area sites onto which some components of the gas stream become preferentially attached. Types of solid particles which may be used in processing gas streams in this manner include charcoals, zeolites, silica or alumina gels.

The mass of the condensed particles may also be increased by introducing material which is or contains a chemical reactant which reacts with and removes reactive components from the gas stream by inertial separation of the new heavier species created in the reaction. For example, sodium hydroxide or calcium hydroxide or amines or similar basic materials might be selected to remove carbon dioxide and/or hydrogen sulfide from natural gas streams.

The material introduced into the gas stream and onto which the components of the gas stream dissolve, react or adsorb collects in collection chamber 27 along with the separated condensed components of the gas stream and may be separated from the condensed components in a rejuvenation unit, not shown, and recycled into the gas stream through conduit 42, 41A or 42, 41.

Supersonic expansion of a gas stream which contains water vapor usually causes the temperature of the gas stream to be reduced below the water dew point. The water forms hydrate solids (or semisolids) with some of the hydrocarbon components of the gas stream (when, for example, the gas stream is a natural gas stream). These hydrates and other condensed solids deposit on the permeable separator wall and reduce the efficiency of separation of the condensed particles from the gas stream unless inhibited from forming. An antifreeze material introduced into the gas stream provides an effective dehydration agent and contributes to efficient operation of the supersonic separator. The dehydration agent, which may be, for example, methyl alcohol or ethylene or diethylene glycol, when mixed with the gas stream, depresses the freezing point and thus maintains as liquids the otherwise solid-forming components which condense upon expansion cooling of the gas stream. The water containing the antifreeze agent passes through the wall unhindered.

Figure 2:
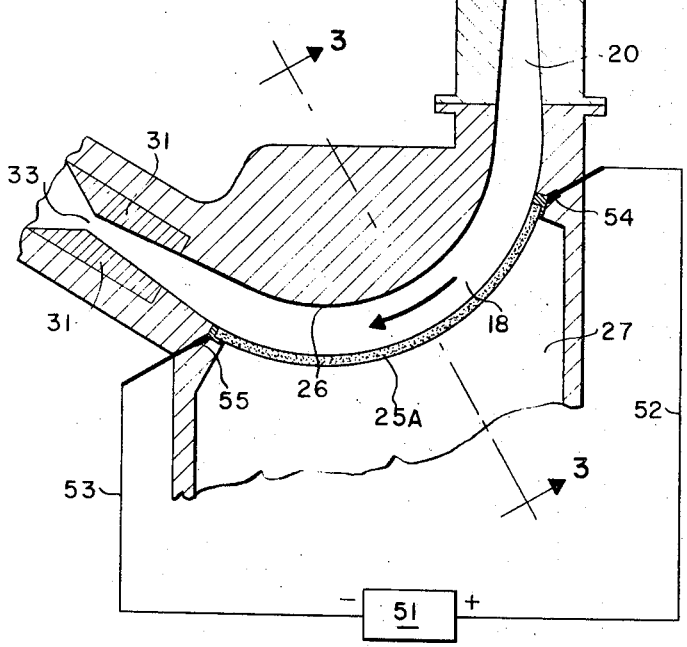
FIG. 2 illustrates another embodiment of the invention in which the permeable wall of the supersonic expander separator is heated.
Figure 3:
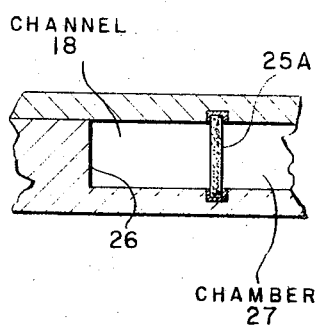
FIG. 3 is a view taken on lines 3—3 of FIG. 2.

As illustrated in FIGS. 2 and 3, the curved outer permeable wall 25A may be heated to melt solids depositing on the wall. The heating element may be a conventional type to provide uniform heating of all parts of the wall or it may be formed of thermistor-like material which has a negative coefficient of electrical resistance such that cold spots on the wall 25A would receive relatively more power than the other segments of the wall. Power is supplied to the wall through contacts 54 and 55 which connect to leads 52 and 53 which, in turn, are connected to a source of electrical power 51. The melted material moves through the wall into collection chamber 27. It may be continuous with a layer of solids on the inner stream side of the wall being deposited and moving toward and through permeable wall 25A as the material adjacent to the wall melts. Wall 25A is preferably thermostated to maintain it at a desired temperature. In conjunction with heating of the wall, material may be introduced to improve efficiency of separation of condensed particles from the gas stream such as described with respect to FIG. 1.

The preferred embodiments of the invention as specifically illustrated and described herein may be modified without departing from the spirit and scope of the invention as defined in the appended claims.

Other supersonic separator apparatus and techniques may be utilized with the concepts disclosed herein such as those illustrated and described in the following copending United States patent applications: Ser. No. 730,372, entitled, "Jet Pump and Supersonic Flow Separator," by Robert L. Garrett, filed May 20, 1968; Ser. No. 730,375, entitled, "Triangular Supersonic Flow Separator," by Robert L. Garrett and William J. McDonald, Jr., filed May 20, 1968; Ser. No. 730,373, entitled, "Supersonic Flow Separator With Film Flow Collector," by Robert L. Garrett, filed May 20, 1968; and Ser. No. 730,371, entitled, "Supersonic Flow Separator," by Robert L. Garrett, filed May 20, 1968.

Having fully described the apparatus, method, objects and advantages of our invention, we claim:

1. A method for condensing and separating components from a multicomponent gas stream comprising:
  expanding said gas stream through a supersonic effuser to achieve low temperatures and low pressures in the supersonic gas stream and thereby form condensed particles;
  inertially moving said condensed particles through a permeable wall to separate said condensed particles from said gas stream;
  decelerating said gas stream to subsonic flow through a diffuser and recovering thereby as pressure a portion of the energy of said gas stream; and
  mixing a material with said gas stream prior to separation of said condensed particles from said gas stream to increase the volumetric liquid/vapor ratio to enhance liquid recovery efficiency by increasing liquid droplet coalescence rate and the mass of said condensed particles to aid inertial ejection thereof from said gas stream to improve efficiency of separation of said condensed particles from said gas stream.

2. A method as recited in claim 1 in which said material comprises LPG and said gas stream comprises a natural gas stream.

3. A method as recited in claim 1 including separating said material from said condensed particles and recycling said separated material to said gas stream.

4. A method for condensing and separating components from a multicomponent gas stream comprising:
  expanding said gas stream through a supersonic effuser to achieve low temperatures and low pressures in the supersonic gas stream and thereby form condensed particles;
  inertially moving said condensed particles through a permeable wall to separate said condensed particles from said gas stream;
  decelerating said gas stream to subsonic flow through a diffuser and recovering thereby as pressure a portion of the energy of said gas stream; and
  mixing a finely dispersed solid material into said gas stream to furnish large surface area sites onto which selected components of said gas stream are adsorbed and become preferentially attached and to increase the mass of said condensed particles to aid inertial ejection thereof from said gas stream and improve efficiency of separation of said condensed particles from said gas stream.

5. A method as recited in claim 4 in which said material comprises a compound selected from the group consisting of charcoal, zeolite, silica gel and alumina gel and said gas stream comprises a natural gas stream.

6. A method as recited in claim 4 including separating said material from said condensed particles and recycling said separated material to said gas stream.

7. A method for condensing and separating components from a multicomponent gas stream comprising:
  expanding said gas stream through a supersonic effuser to achieve low temperatures and low pressures in the supersonic gas stream and thereby form condensed particles;
  inertially moving said condensed particles through a permeable wall to separate said condensed particles from said gas stream;
  decelerating said gas stream to subsonic flow through a diffuser and recovering thereby as pressure a portion of the energy of said gas stream; and
  mixing a material into said gas stream as a dispersed liquid into which selected components of said gas stream are preferentially absorbed to increase the mass of said condensed gas particles to aid inertial ejection thereof from said gas stream and improve efficiency of separation of said condensed particles from said gas stream.

8. A method as recited in claim 7 including separating said material from said condensed particles and recycling said separated material to said gas stream.

9. A method as recited in claim 7 in which said material comprises a lean oil solvent and said gas stream comprises a natural gas stream.

10. A method as recited in claim 9 in which said lean oil is refrigerated prior to mixture thereof with said gas stream.

11. A method for condensing and separating components from a multicomponent gas stream comprising:
  expanding said gas stream through a supersonic effuser to achieve low temperatures and low pressures in the supersonic gas stream and thereby form condensed particles;
  inertially moving said condensed particles through a permeable wall to separate said condensed particles from said gas stream;
  decelerating said gas stream to subsonic flow through a diffuser and recovering thereby as pressure a portion of the energy of said gas stream; and
  mixing an antifreeze agent material adapted to inhibit formation of solids at low temperatures with said gas stream prior to separation of said condensed particles from said gas stream to improve efficiency of separation of said condensed particles from said gas stream.

12. A method as recited in claim 11 in which said material comprises a compound selected from the group consisting of alcohols and glycols.

13. A method for condensing and separating components from a multicomponent gas stream comprising:
  expanding said gas stream through a supersonic effuser to achieve low temperatures and low pressures in the supersonic gas stream and thereby form condensed particles;
  inertially moving said condensed particles through a permeable wall to separate said condensed particles from said gas stream;
  decelerating said gas stream to subsonic flow through a diffuser and recovering thereby as pressure a portion of the energy of said gas stream; and
  mixing a material comprising a chemical adapted to react with selected components of said gas stream with said gas stream prior to separation of said condensed particles from said gas stream to increase the mass of said condensed particles and improve efficiency of separation of said condensed particles from said gas stream.

14. A method as recited in claim 13 in which said material comprises an acidic solution and said gas stream comprises an ammonia gas stream.

15. A method for condensing and separating components from a multicomponent gas stream comprising:
  expanding said gas stream through a supersonic effuser to achieve low temperatures and low pressures in the supersonic gas stream and thereby form condensed particles;
  inertially moving said condensed particles through a permeable wall to separate said condensed particles from said gas stream;
  decelerating said gas stream to subsonic flow through a diffuser and recovering thereby as pressure a portion of the energy of said gas stream;
  mixing a material with said gas stream prior to separation of said condensed particles from said gas stream to improve efficiency of separation of said condensed particles from said gas stream; and
  heating said permeable wall to melt solids which may form in said gas stream and deposit on said permeable wall.

16. Apparatus for condensing and separating components from a multicomponent gas stream comprising:
  a supersonic effuser capable of expanding said gas stream to achieve low temperatures and low pressures in said supersonic gas stream and to form thereby condensed particles;

separation means through which said gas stream is adapted to be passed for separating said condensed particles from said gas stream;

said separation means including a curved flow path having an outer curved permeable wall;

means arranged upstream of said separation means adapted to inject material into said gas stream for admixture therewith to improve efficiency of separation of said condensed particles; and a diffuser capable of decelerating said gas stream to subsonic flow to recover as pressure a portion of the energy of said gas stream.

17. Apparatus as recited in claim 16 in which said material is introduced upstream of said effuser throat.

18. Apparatus as recited in claim 16 in which said material is introduced downstream of said effuser throat.

19. Apparatus as recited in claim 16 including means adapted to heat said permeable wall.

References Cited
UNITED STATES PATENTS 1,519,428   12/1924   Wilisch _____ 55—461

OTHER REFERENCES

Cornvich et al.: "Handbook of Supersonic Aerodynamics," section 17, Navweps Report 1488, vol. 6, January 1964, pp. 237–240 and 273–275.

REUBEN FRIEDMAN, Primary Examiner

C. N. HART, Assistant Examiner

U.S. Cl. X.R.

55—277, 421, 461